United States Patent
Eo et al.

(10) Patent No.: US 9,133,917 B2
(45) Date of Patent: Sep. 15, 2015

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Hee Seok Roh, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 365 days.

(21) Appl. No.: 13/689,125

(22) Filed: Nov. 29, 2012

(65) Prior Publication Data

US 2013/0331225 A1    Dec. 12, 2013

(30) Foreign Application Priority Data

Jun. 12, 2012    (KR) .................. 10-2012-0062420

(51) Int. Cl.
| F16H 15/04 | (2006.01) |
| F16H 37/02 | (2006.01) |
| F16H 61/04 | (2006.01) |
| F16H 15/40 | (2006.01) |

(52) U.S. Cl.
CPC ............. *F16H 15/04* (2013.01); *F16H 37/021* (2013.01); *F16H 61/04* (2013.01); *F16H 15/40* (2013.01); *F16H 2061/0425* (2013.01)

(58) Field of Classification Search
CPC . F16H 15/04; F16H 2061/0425; F16H 61/04; F16H 37/021; F16H 15/40
USPC .................................. 476/51, 22, 47, 36, 38
See application file for complete search history.

(56) References Cited

U.S. PATENT DOCUMENTS

| 224,764 | A | * | 2/1880 | Barnhurst ...................... 476/51 |
| 776,455 | A | * | 11/1904 | Christie ......................... 476/51 |
| 887,961 | A | * | 5/1908 | Pfeiffer ......................... 476/20 |
| 1,081,799 | A | * | 12/1913 | Whipple ........................ 74/721 |
| 1,128,460 | A | * | 2/1915 | Kubitz .......................... 192/215 |
| 1,354,486 | A | * | 10/1920 | Jacques ......................... 476/22 |
| 1,358,447 | A | * | 11/1920 | Hupp ............................. 476/2 |
| 1,844,239 | A | * | 2/1932 | Boehme et al. ................. 476/48 |
| 2,424,873 | A | * | 7/1947 | Abbrecht ....................... 476/72 |
| 2,611,038 | A | * | 9/1952 | Graham ..................... 369/47.37 |
| 3,158,041 | A | * | 11/1964 | Rae ............................. 475/215 |
| 3,286,537 | A | * | 11/1966 | Riley ............................. 476/51 |
| 5,179,865 | A | * | 1/1993 | Line ............................. 476/51 |
| 5,520,592 | A | * | 5/1996 | Rabinow ....................... 476/51 |
| 5,525,119 | A | * | 6/1996 | Marques ....................... 476/51 |
| 5,588,933 | A | * | 12/1996 | Hartman ....................... 476/51 |
| 2010/0184558 | A1 | * | 7/2010 | Kamiya et al. ................ 476/51 |
| 2013/0331225 | A1 | * | 12/2013 | Eo et al. ........................ 476/51 |

* cited by examiner

*Primary Examiner* — David M Fenstermacher
(74) *Attorney, Agent, or Firm* — Morgan, Lewis & Bockius LLP

(57) ABSTRACT

An automated manual transmission for a vehicle may include a shifting section provided with a plurality of shifting units, an input shaft, an output shaft, and a continuously variable power transfer unit disposed between a power providing device and the input and output shafts, wherein the continuously variable power transfer unit includes, a driving conical body selectively engaged to the power providing device, a driven conical body coupled to the output shaft, wherein the driving conical body and the driven conical body have mutual inclination faces correspondingly spaced from each other, and a driving member outer-engaged simultaneously with the mutual inclination faces of the driving conical body and the driven conical body.

13 Claims, 8 Drawing Sheets

AUTOMATED MANUAL TRANSMISSION FOR VEHICLE

CROSS-REFERENCE TO RELATED APPLICATION

The present application claims priority to Korean Patent Application No. 10-2012-0062420, filed on Jun. 12, 2012, the entire contents of which is incorporated herein for all purposes by this reference.

BACKGROUND OF THE INVENTION

1. Field of the Invention

The present disclosure relates to an automated manual transmission. More particularly, it relates to a configuration of the automated manual transmission which makes it possible to improve non-smooth shifting, such as pulling, when shifting.

2. Description of Related Art

The gears of automated manual transmissions are automatically changed by an actuator while a vehicle travels so that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously blocked even during shifting that is automatically performed by an actuator and as a result produced torque decreases and thus the non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

Various aspects of the present invention are directed to providing an automated manual transmission is provided that can improve the commercial value of a vehicle by preventing non-smooth shifting to achieve smooth and stable shifting response, by transferring a separate power to a driving wheel during a shifting while using a conventional shifting mechanism in which power is blocked instantaneously necessarily and connected.

In an aspect of the present invention, an automated manual transmission for a vehicle may include a shifting section provided with a plurality of shifting units and implementing different gear ratio between an input shaft and an output shaft, and a continuously variable power transfer unit disposed between a power providing device and the input and output shafts and selectively providing a power of the power providing device to the output shaft at a continuously variable gear ratio, wherein the continuously variable power transfer unit may include a driving conical body that is selectively engaged to the power providing device, a driven conical body coupled to the output shaft, wherein the driving conical body and the driven conical body are aligned in parallel and may have mutual inclination faces that are correspondingly spaced from each other, and a driving member which is outer-engaged simultaneously with the mutual inclination faces of the driving conical body and the driven conical body and is moved such that a part being in contact with the driving conical body and the driven conical body is varied and a power of the driving conical body is transferred to the driven conical body at the continuously variable gear ratio.

A power intermittent unit transferring or blocking a power of the driven conical body is provided between the driven conical body and the output shaft.

The driving conical body is arranged coaxially with the input shaft and the driven conical body is arranged coaxially or in parallel with the output shaft.

The automated manual transmission may further include a driving gear for transferring the power of the driven conical body to the output shaft is provided on a rotation shaft of the driven conical body, and a driven gear that is meshed with the driving gear and provided on the output shaft, wherein the power intermittence unit is arranged on the rotation shaft of the driven conical body for intermitting power between the driven conical body and the driving gear.

A clutch for providing intermittently the power of the power providing device to the input shaft is provided between the input shaft and the power providing device.

The clutch may include a clutch disk that is selectively in contact with a fly wheel, and a clutch cover which surrounds the clutch disk, wherein the driving conical body is connected to the clutch cover, and wherein the input shaft is connected to the clutch disk by passing through the driving conical body at a rotation axis thereof.

The power providing device is an engine which is an internal combustion engine.

The driving member is arranged to move straightly along the mutual inclination faces and a driving member moving device is provided to move straightly the moving member along the mutual inclination faces.

Inner tapered-inclination surfaces adjacent to each other of the driving conical body and the driven conical body are parallel to each other and outer tapered-inclination surfaces thereof remote from each other are parallel to each other, the driving member is arranged to move straightly along a parallel direction to the outer inclination surface of the driving conical body and the driven conical body, and a driving member moving device for moving straightly the moving member along the outer inclination surface of the driving conical body and the driven conical body is provided.

Shifting mechanism of the shifting section is synchronized and meshed by using a key and a synchronizer.

Shifting mechanism of the shifting section is configured by a dog clutch.

A rear driving idler gear is positioned between the input shaft and the output shaft.

The driving member is in shape of sphere and rotatably coupled to a guide rod.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
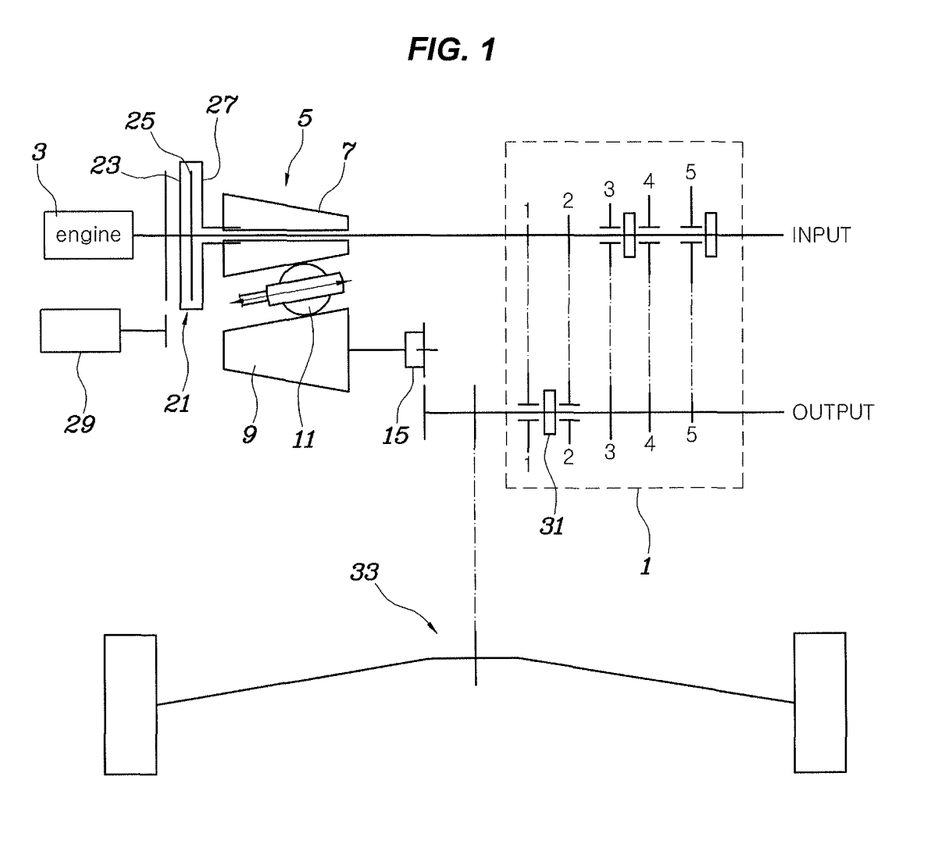
FIG. 1 is a view showing a structure of an automated manual transmission according to various exemplary embodiments of the present invention.

Referring to FIG. 1, an automated manual transmission according to an exemplary embodiment of the present invention includes: a shifting section 1 provided with a plurality of shifting units for implementing different gear ratio between an input shaft and an output shaft, and a continuously variable power transfer unit 5 for transferring the power from a power providing device 3 to the output shaft at a continuously variable gear ratio, which is disposed between the power providing device 3 for providing the power to the input shaft of the shifting section 1 and the output shaft.

That is, with respect to the shifting section 1 having a conventional manual transmission shifting mechanism, power is transferred from the power providing device 3 to the continuously variable power transfer unit 5 in parallel and is provided to the output shaft continuously so as to be a round-about way to the input shaft when the shifting section 1 is shifted, thereby preventing the torque decrease due to power block during a shifting.

In an exemplary embodiment of the present invention, the continuously variable power transfer device 5 may include: a driving conical body 7 connected to a rotation shaft of the power providing device 3, a driven conical body 9 in which mutual inclination faces are provided so as to be correspondingly spaced from each other with respect to a rotation shaft parallel to the rotation shaft of the driving conical body 7 and which is connected to the output shaft, and a driving member 11 which is outer-engaged simultaneously with parts of the driving conical body 7 and the driven conical body 9 to connect them in series and is moved such that the part being in contact with the driving conical body 7 and the driven conical body 9 is varied thereby transferring power between the driving conical body 7 and the driven conical body 9 at continuously variable gear ratio.

That is, the power is transferred such that the driving member 11 of a spherical shape is in contact simultaneously with the driving conical body 7 and the driven conical body 9 so that the rotation force from the driving conical body 7 is transferred to the driving member 11 and then the driven conical body 9 is rotated by the driving member 11 wherein the parts of the driving member being in contact with the driving conical body 7 and the driven conical body 9 are varied so that a rotation radius of the part of the driving conical body 7 being in contact with the driving member 11 and a rotation radius of the driven conical body 9 being in contact with the driving member 11 are varied continuously, thereby varying continuously gear ratio.

Figure 2:
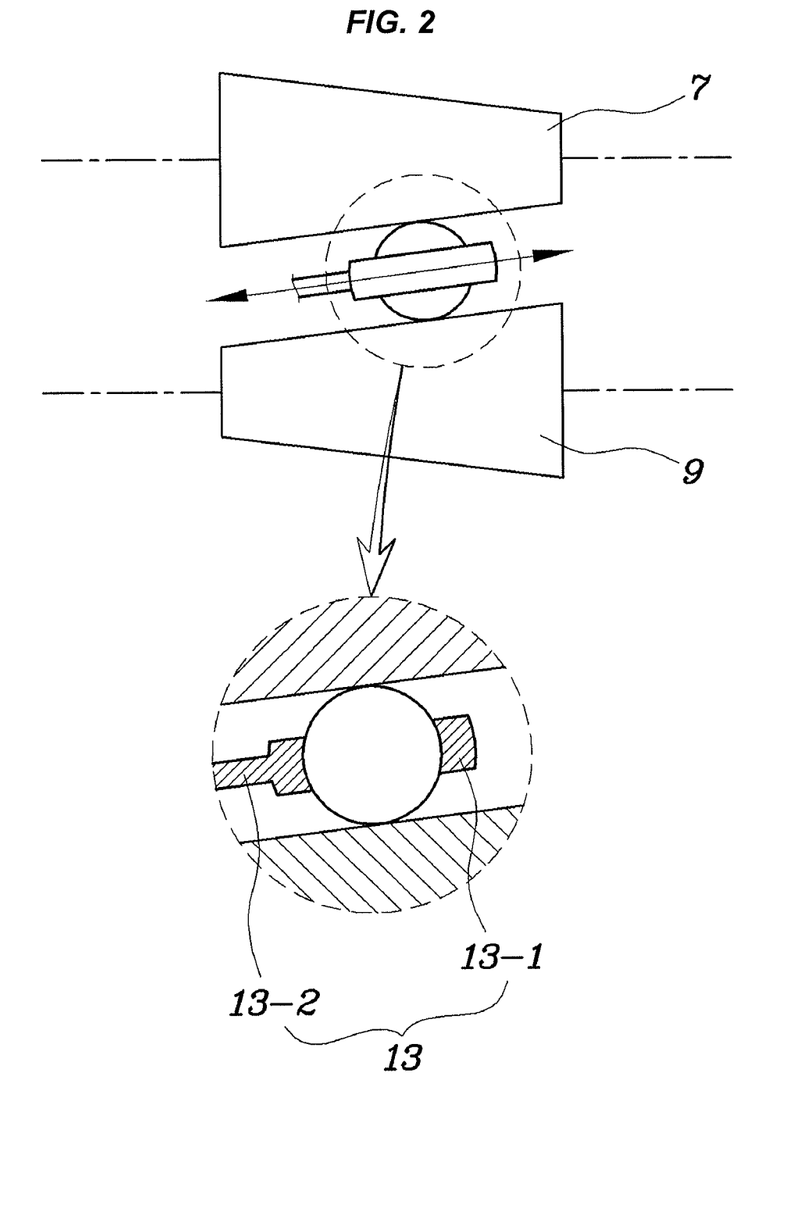
FIG. 2 is a view showing a continuously variable shift principle of a driving conical body, a driven conical body and a driving member in FIG. 1.

Here, a driving member moving device 13 is necessary to move the moving member 11 wherein known other devices may be used as the driving member moving device and as shown in FIG. 2, the parts of the driving member moving device being in contact with the driving conical body 7 and the driven conical body 9 may be exposed, and it may include a guide ring 13-1 for surrounding the central surface of the driving member 11 to restrict and control a location of the driving member 11, a guide rod 13-2 for moving straightly the guide ring 13-1 through a gap formed between the driving conical body 7 and the driven conical body 9, and an actuator such as a motor for providing a straight movement force to the guide rod 13-2.

In this case, when the guide ring 13-1 and the guide rod 13-2 are moved straightly, the driving member 11 is moved straightly and further gear ratio can be varied continuously while the driving member 11 contacts simultaneously the driving conical body 7 and the driven conical body 9.

Meanwhile, the driven conical body 9 is arranged coaxially with the output shaft and a power intermittence unit 15 for transferring or blocking power may be provided between the driven conical body 9 and the output shaft, and further the driving conical body 7 is arranged coaxially with the input shaft.

Figure 7:
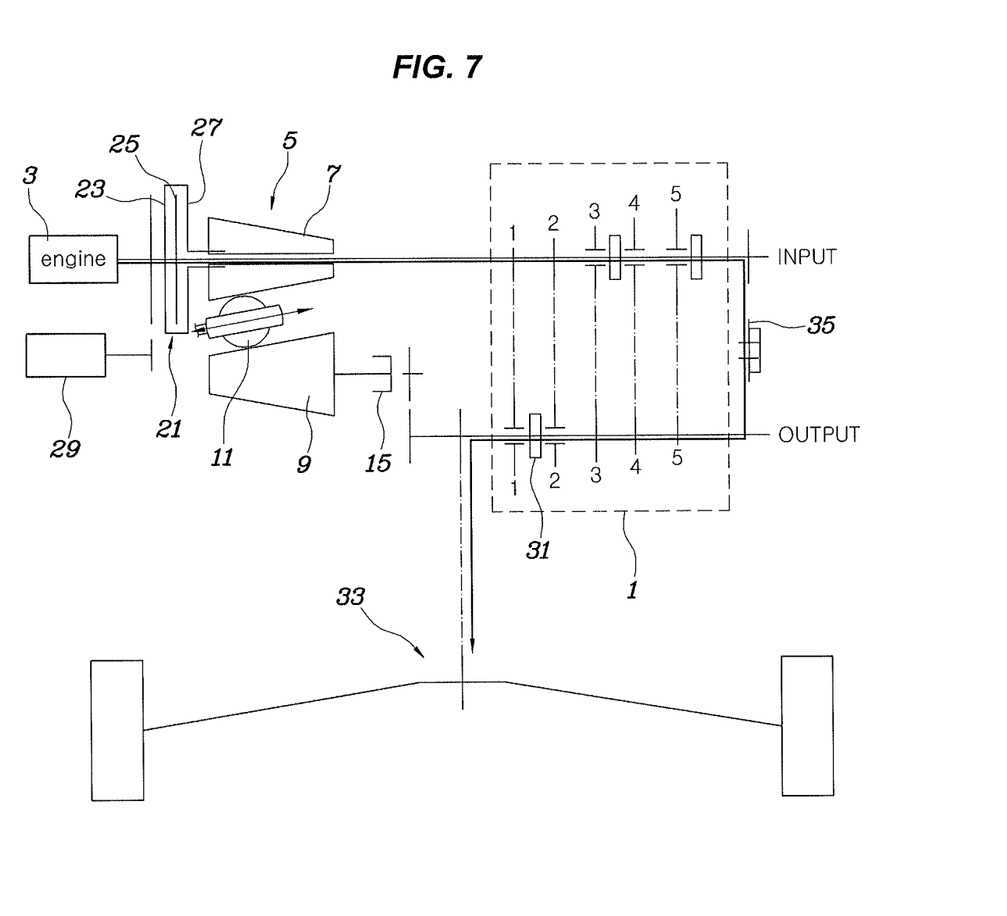
FIG. 7 is a view showing a power transmission relation during an R stage travel in FIG. 1.
Figure 8:
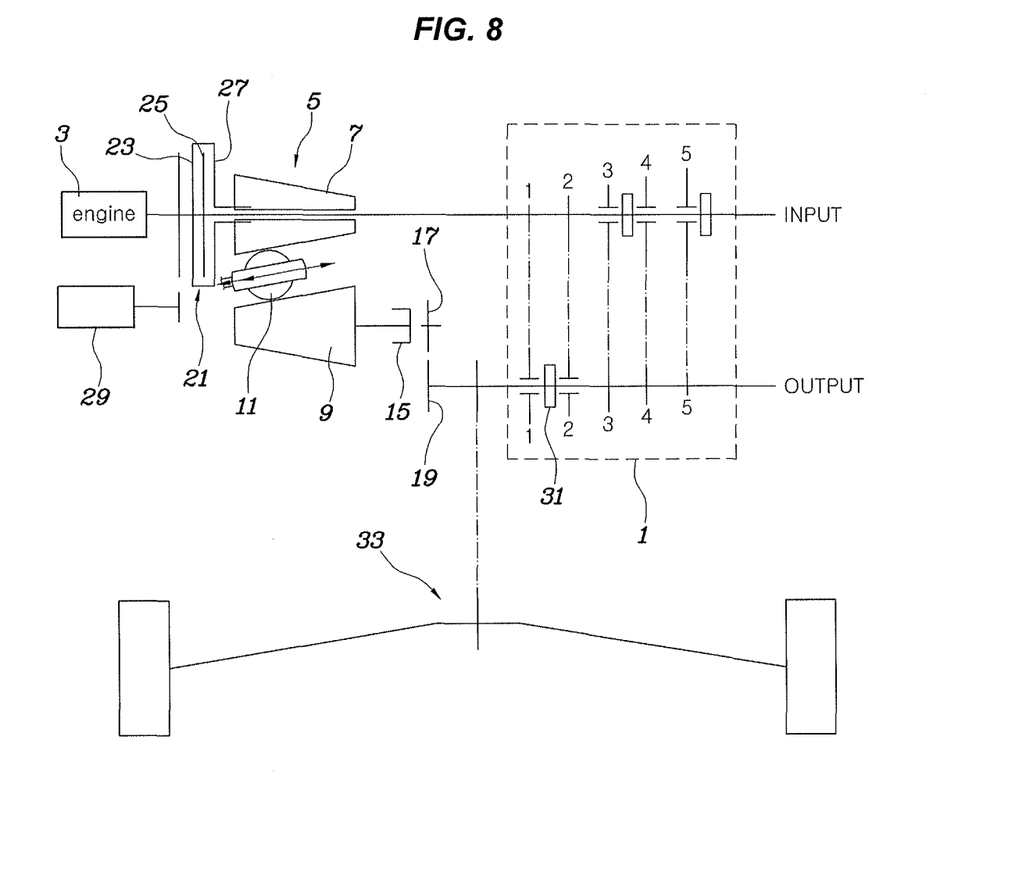
FIG. 8 is a view showing a structure of an automated manual transmission according to various embodiments of the present invention.

In comparison to the above configuration, FIG. 8 shows another embodiment of the present invention wherein a driving gear 17 for transferring power to the output shaft is provided on a rotation shaft of the driven conical body 9 and a driven gear 19 that is meshed with the driving gear 17 is provided on the output shaft, and the power intermittence unit 15 is arranged on a rotation shaft of the driven conical body 9 for intermitting power between the driven conical body 9 and the driving gear 17. Here, according to an exemplary embodiment of the present embodiment, the rotation direction of the output shaft is reversed, comparing to the configuration as shown in FIGS. 1 to 7, wherein an engine and a transmission in a vehicle may be arranged differently thereby providing a freedom degree.

Meanwhile, a clutch unit 21 for providing intermittently power from the power providing device 3 to the input shaft may be provided between the input shaft and the power providing device 3.

In the present embodiment, the power providing device 3 may be an engine which is an internal combustion engine and further the clutch unit 21 may include a clutch disk 25 that is to be in contact with a fly wheel 23 of the engine, and further the driving conical body 7 may be connected to a clutch cover 27 which surrounds the outer part of the clutch disk 25 and in which a hollow shaft through which the input shaft passes is formed.

That is, the clutch disk 25 and the fly wheel 23 are arranged in the same manner as the conventional clutch mechanism, but in the present embodiment, there is difference in that the clutch cover 27 serves as a hollow rotation shaft for connecting the driving conical body 7 to the fly wheel 23 and transferring rotation force. Through this configuration, a compact power train configuration is possible while using in maximum the conventional manual transmission clutch mechanism.

In the exemplary embodiments of the present invention, the shifting mechanism of the shifting section 1 is configured in synchro-mesh way in which gears are synchronized and then meshed using a key and a synchronizer ring, however, in addition to this configuration, the shifting mechanism of the shifting section 1 may be configured by using other mechanism such as a dog clutch, etc.

In the exemplary embodiments of the present invention, the shifting section 1 is configured by the shifting mechanism of the synchro-mesh type and the shifting section 1 is exemplary provided with a first to a fifth stages and R stage.

The operation of the present invention will be described, referring to FIGS. 3 to 7 wherein in FIG. 7 R stage of a rear driving is illustrated and a rear driving idler gear 35, which is omitted in FIGS. 1 to 6, is further illustrated.

Figure 3:
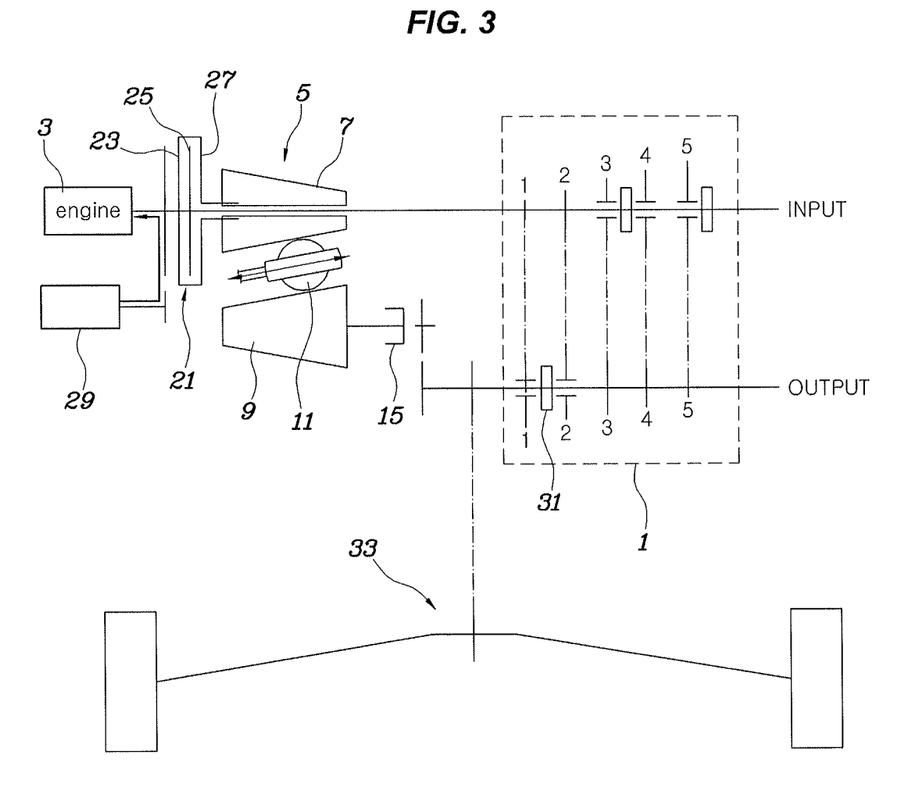
FIG. 3 is a view showing a power transmission relation when an engine starts in FIG. 1.

FIG. 3 shows an engine starting state wherein the engine is cranked by a starting motor 29 and is started while the clutch unit 21 and the power intermittent unit 15 are all cut. Accordingly, a rotation force of the engine is transferred only to the driven conical body 9 through the driving conical body 7 and the driving member 11 while power is not transferred to the input shaft and the output shaft.

Of course, the engine may start while the clutch is connected if the shifting section 1 does not connect any shifting stages when the engine is started.

Figure 4:
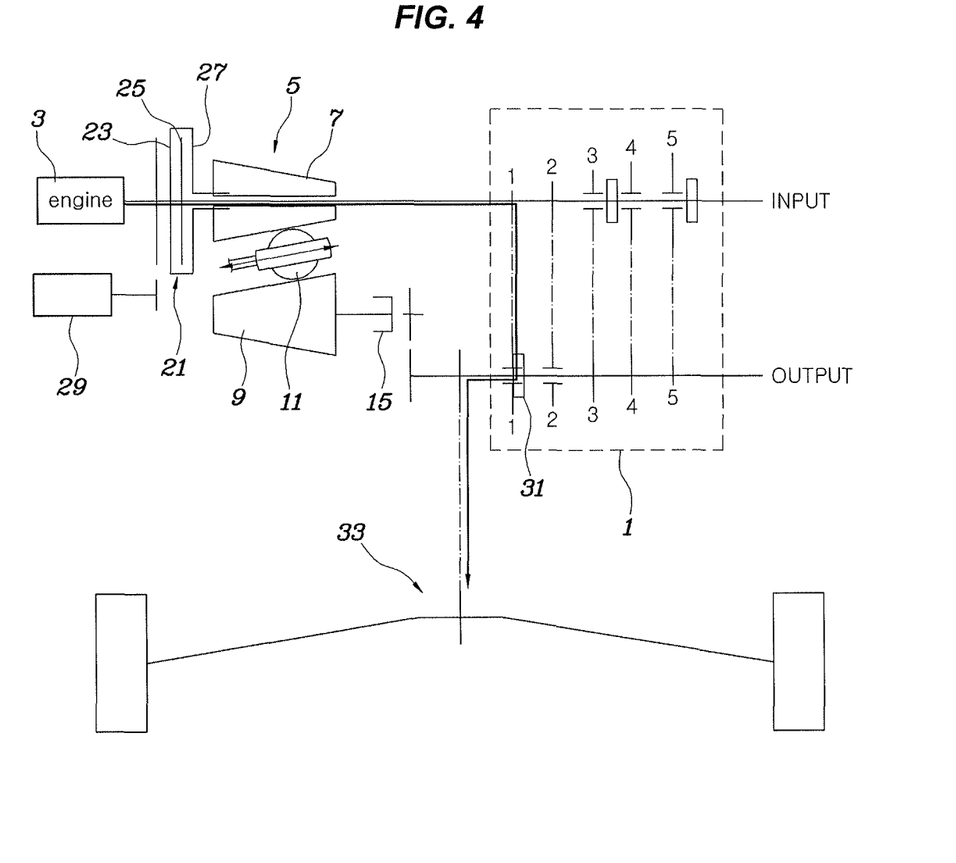
FIG. 4 is a view showing a power transmission relation during a first stage travel in FIG. 1.

In the above-described state, when the clutch unit 21 is cut, the first stage shifting gears may be configured by a first-second stage synchro-mesh device 31, and when the clutch unit 21 is connected while the first stage shifting gears are formed, a vehicle accelerates and drives at a first stage as shown in FIG. 4.

In FIG. 4, power from an engine is transferred to the input shaft through the clutch unit 21 and then transferred to the output shaft while it is shifted to a first stage through a first shifting gear pair, and provided to a driving wheel through a differential 33.

At this time, the power intermittent unit 15 is kept in a cutting state and the power through the driving conical body 7 and the driven conical body 9 is not transferred to the output shaft.

Figure 5:
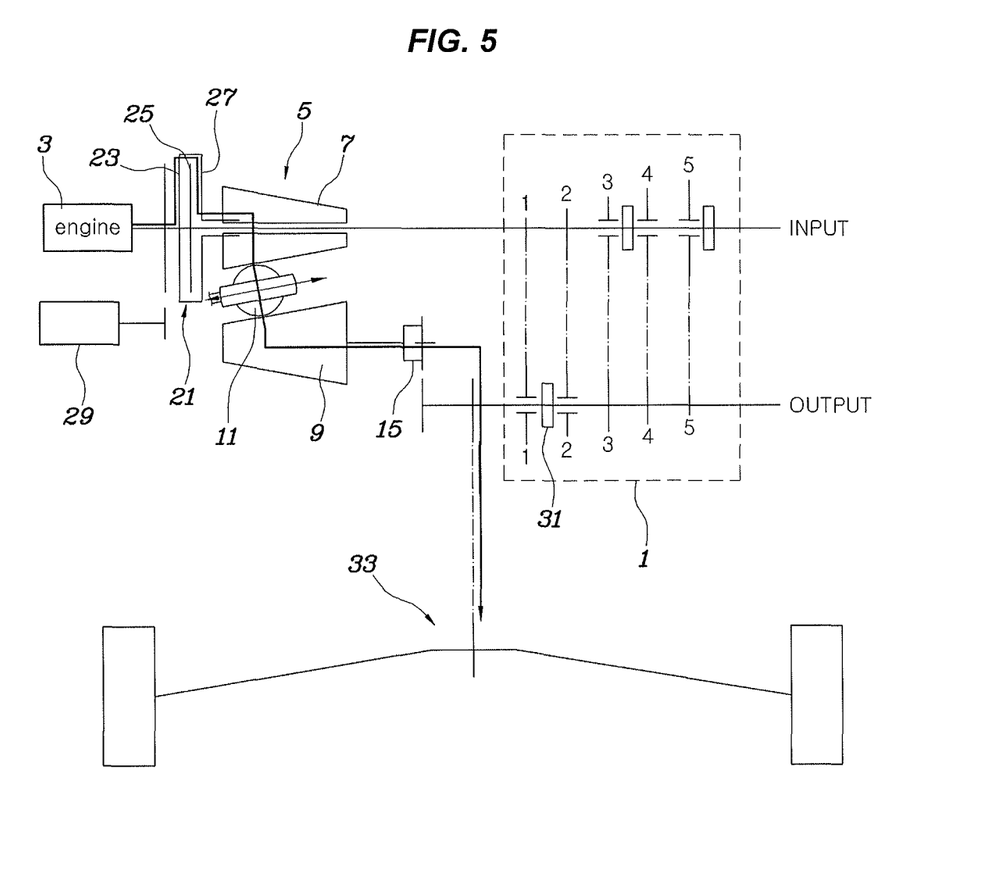
FIG. 5 is a view showing a power transmission relation during a shifting from a first stage to a second stage travel in FIG. 1.

FIG. 5 shows an intermediate course of shifting from a first stage to a second stage wherein the power intermittent unit 15 is connected and power from an engine is transferred to the output shaft through the driving conical body 7, the driving member 11 and the driven conical body 9 while the clutch is cut and the power from the engine is blocked to the input shaft, thereby preventing toque decrease during a shifting.

At this time, a gear ratio formed together with the driving conical body 7, the driven conical body 9 and the driving member 11 is adjusted from a state in which the driven conical body 9 corresponds to a rotation speed of the output shaft in a first stage to a state in which the driven conical body 9 corresponds to a rotation speed of the output shaft in a second stage wherein the driving member 11 is moved straightly by driving the driving member moving device 13 to form continuously a desired gear ratio, thereby preventing the torque decrease caused from blocking the torque being transferred to the input shaft by the clutch unit 21 during a shifting from a first stage to a second stage and being capable of connecting smoothly a current stage and a target-stage.

As described above, the first-second stage synchro-mesh device 31 releases a first stage and completes the mesh to a second stage while the clutch unit 21 is cut and the power intermittent unit 15 is connected and thus power from the engine is supplied in a roundabout way to the output shaft through the driving conical body 7 and the driven conical body 9.

Figure 6:
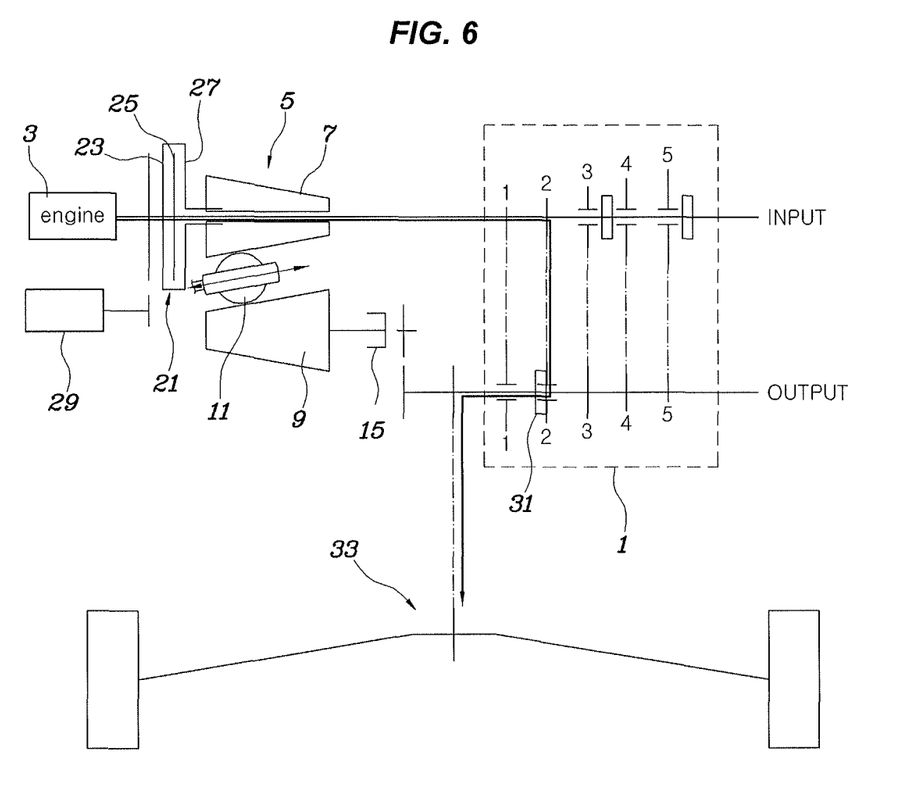
FIG. 6 is a view showing a power transmission relation during a second stage travel in FIG. 1.

After the second stage shifting gears are meshed, the clutch unit 21 is connected and the power intermittent unit 15 is cut, and then a second stage driving is implemented, as shown in FIG. 6.

In FIG. 6, the power from an engine is adjusted to a second stage shifting between the input shaft and the output shaft through the clutch unit 21 and is supplied to a driving wheel through the differential 33 while the power that is transferred from the engine to the driven conical body 9 is blocked by the power intermittent unit 15.

The continuous power supply to the output shaft by the driving conical body 7, the driving member 11 and the driven conical body 9 during a shifting of a first stage to a second stage is performed in the same way as other stages. Specially, even in case of high shifting stages such as a fourth and fifth stage, even overdrive shifting stage, in addition to a shifting between a first stage and a second stage, the power is compensated while a rotation speed of the output shaft of current shifting stage and a target shifting stage between the driving conical body 7 and the driven conical body 9 is varied continuously, thereby preventing the torque decrease and providing stable and smooth shifting feeling within an entire shifting range of the transmission.

Meanwhile, FIG. 7 shows a power transference situation while a vehicle is rear-driven wherein the rear driving idler gear 35 between the input shaft and the output shaft while a vehicle is stopped, thereby implementing a rear driving shifting stage.

According to an exemplary embodiment of the present invention, an automated manual transmission is provided that can improve the commercial value of a vehicle by preventing non-smooth shifting to achieve smooth and stable shifting response, by transferring a separate power to a driving wheel during a shifting while using a conventional shifting mechanism in which power is blocked instantaneously necessarily and connected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle comprising:
    a shifting section provided with a plurality of shifting units and implementing different gear ratios between an input shaft and an output shaft; and
    a continuously variable power transfer unit disposed between a power providing device and the input and output shafts and selectively providing a power of the power providing device to the output shaft at a continuously variable gear ratio,
    wherein the continuously variable power transfer unit includes;
        a driving conical body selectively engaged to the power providing device;
        a driven conical body coupled to the output shaft, wherein the driving conical body and the driven conical body are aligned in parallel and have mutual inclination faces correspondingly spaced from each other; and
        a driving member outer-engaged simultaneously with the mutual inclination faces of the driving conical body and the driven conical body, and is moved, such that a part being in contact with the driving conical body and the driven conical body is varied, and power of the driving conical body is transferred to the driven conical body at the continuously variable gear ratio,
        said shifting section comprising a shifting mechanism, and said shifting mechanism is synchronized and meshed by using a key and a synchronizer.

2. The automated manual transmission for the vehicle of claim 1, wherein a power intermittent unit transferring or blocking a power of the driven conical body is provided between the driven conical body and the output shaft.

3. The automated manual transmission for the vehicle of claim 1, wherein the driving conical body is arranged coaxially with the input shaft and the driven conical body is arranged coaxially or in parallel with the output shaft.

4. The automated manual transmission for the vehicle of claim 2, further including:
    a driving gear for transferring the power of the driven conical body to the output shaft is provided on a rotation shaft of the driven conical body; and
    a driven gear that is meshed with the driving gear and provided on the output shaft,
    wherein the power intermittence unit is arranged on the rotation shaft of the driven conical body for intermitting power between the driven conical body and the driving gear.

5. The automated manual transmission for the vehicle of claim 1, wherein a clutch for providing intermittently the power of the power providing device to the input shaft is provided between the input shaft and the power providing device.

6. The automated manual transmission for the vehicle of claim 5, wherein the clutch includes:
    a clutch disk selectively in contact with a fly wheel, and
    a clutch cover surrounding the clutch disk,
    wherein the driving conical body is connected to the clutch cover, and
    the input shaft is connected to the clutch disk by passing through the driving conical body at a rotation axis thereof.

7. The automated manual transmission for the vehicle of claim 5, wherein the power providing device is an engine which is an internal combustion engine.

8. The automated manual transmission for the vehicle of claim 1, wherein the driving member is arranged to move straightly along the mutual inclination faces and a driving member moving device is provided to move straightly the moving member along the mutual inclination faces.

9. The automated manual transmission for the vehicle of claim 1, wherein inner tapered-inclination surfaces adjacent to each other of the driving conical body and the driven conical body are parallel to each other and outer tapered-inclination surfaces thereof remote from each other are parallel to each other, the driving member is arranged to move straightly along a parallel direction to the outer inclination surface of the driving conical body and the driven conical body, and a driving member moving device for moving straightly the moving member along the outer inclination surface of the driving conical body and the driven conical body is provided.

10. The automated manual transmission for the vehicle of claim 1, wherein shifting mechanism of the shifting section is configured by a dog clutch.

11. The automated manual transmission for the vehicle of claim 1, wherein a rear driving idler gear is positioned between the input shaft and the output shaft.

12. An automated manual transmission for a vehicle comprising:
    a shifting section provided with a plurality of shifting units and implementing different gear ratios between an input shaft and an output shaft; and
    a continuously variable power transfer unit disposed between a power providing device and the input and output shafts and selectively providing a power of the power providing device to the output shaft at a continuously variable gear ratio,
    wherein the continuously variable power transfer unit includes;
        a driving conical body selectively engaged to the power providing device;
        a driven conical body coupled to the output shaft, wherein the driving conical body and the driven conical body are aligned in parallel and have mutual inclination faces correspondingly spaced from each other; and
        a driving member outer-engaged simultaneously with the mutual inclination faces of the driving conical body and the driven conical body, and is moved, such that a part being in contact with the driving conical body and the driven conical body is varied, and power of the driving conical body is transferred to the driven conical body at the continuously variable gear ratio,
    wherein the driving member is sphere-shaped and rotatably coupled to a guide rod.

13. An automated manual transmission for a vehicle comprising:
- a shifting section provided with a plurality of shifting units and implementing different gear ratios between an input shaft and an output shaft; and
- a continuously variable power transfer unit disposed between a power providing device and the input and output shafts and selectively providing a power of the power providing device to the output shaft at a continuously variable gear ratio, wherein the continuously variable power transfer unit includes;
- a driving conical body selectively engaged to the power providing device;
- a driven conical body coupled to the output shaft, wherein the driving conical body and the driven conical body are aligned in parallel and have mutual inclination faces correspondingly spaced from each other; and
- a driving member outer-engaged simultaneously with the mutual inclination faces of the driving conical body and the driven conical body, and is moved, such that a part being in contact with the driving conical body and the driven conical body is varied, and power of the driving conical body is transferred to the driven conical body at the continuously variable gear ratio, wherein the clutch includes:
- a clutch disk selectively in contact with a fly wheel, and
- a clutch cover surrounding the clutch disk, wherein the driving conical body is connected to the clutch cover, and
the input shaft is connected to the clutch disk by passing through the driving conical body at a rotation axis thereof.

* * * * *